(12) United States Patent
Lin

(10) Patent No.: US 12,092,141 B2
(45) Date of Patent: Sep. 17, 2024

(54) SCREW HAVING STACKED SCREW HEADS

(71) Applicant: Alpha Networks Inc., Hsinchu (TW)

(72) Inventor: Tzu-Chih Lin, Hsinchu (TW)

(73) Assignee: ALPHA NETWORKS INC., Hsinchu (TW)

(*) Notice: Subject to any disclaimer, the term of this patent is extended or adjusted under 35 U.S.C. 154(b) by 154 days.

(21) Appl. No.: 17/948,626

(22) Filed: Sep. 20, 2022

(65) Prior Publication Data

US 2023/0125947 A1     Apr. 27, 2023

(30) Foreign Application Priority Data

Oct. 27, 2021 (TW) ................................. 110139782

(51) Int. Cl.
*F16B 33/04* (2006.01)
*F16B 31/02* (2006.01)
*F16B 41/00* (2006.01)

(52) U.S. Cl.
CPC .......... *F16B 31/021* (2013.01); *F16B 41/005* (2013.01)

(58) Field of Classification Search
CPC ....... F16B 41/005; F16B 31/02; F16B 31/021
USPC .................................................. 411/2–4, 410
See application file for complete search history.

(56) References Cited

U.S. PATENT DOCUMENTS

| 1,910,182 | A | * | 5/1933 | Robertson | ........... | F16B 23/0092 |
|---|---|---|---|---|---|---|
| | | | | | | 411/410 |
| 3,174,383 | A | * | 3/1965 | Heil | ........... | F16B 41/00 |
| | | | | | | 411/39 |
| 8,668,419 | B2 | * | 3/2014 | Hardt | ........... | H01R 4/307 |
| | | | | | | 411/5 |
| 2003/0198528 | A1 | * | 10/2003 | Onishi | ........... | F16B 31/021 |
| | | | | | | 411/2 |
| 2004/0039383 | A1 | * | 2/2004 | Jackson | ........... | A61B 17/7091 |
| | | | | | | 606/273 |
| 2006/0228186 | A1 | * | 10/2006 | Shinjo | ........... | F16B 25/0021 |
| | | | | | | 411/5 |
| 2013/0280004 | A1 | * | 10/2013 | Kim | ........... | F16L 33/08 |
| | | | | | | 411/2 |

(Continued)

FOREIGN PATENT DOCUMENTS

| CN | 202100590 | 1/2012 |
|---|---|---|
| CN | 202215569 | 5/2012 |

(Continued)

OTHER PUBLICATIONS

SIPO OA issued on May 13, 2024.

*Primary Examiner* — Gary W Estremsky
(74) *Attorney, Agent, or Firm* — WPAT, P.C

(57) ABSTRACT

A screw having stacked screw heads includes a screw shank portion with a thread and a screw head portion rigidly connected to each other. The screw head portion is driven to bring the screw shank portion to rotate. The screw head portion includes a first screw head and a second screw head. The first screw head has a first shaped groove on its top plane to receive an operating torque. A neck portion is connected to a bottom plane of the first screw head and a top plane of the second screw head. The second screw head has a second shaped groove on its top plane. The neck portion or the connection between the neck portion and the first screw head or the second screw head has lower torsional endurance than each of the first screw head and the second screw head.

7 Claims, 4 Drawing Sheets

(56) References Cited

U.S. PATENT DOCUMENTS

| | | | |
|---|---|---|---|
| 2014/0241826 A1 | 8/2014 | Caponera et al. | |
| 2016/0104952 A1* | 4/2016 | Beck | H01R 4/366 439/814 |
| 2016/0322715 A1* | 11/2016 | Beiler | H01R 4/366 |
| 2020/0370588 A1* | 11/2020 | Maloney | F16B 31/027 |
| 2023/0287922 A1* | 9/2023 | Hast | F16B 31/021 |

FOREIGN PATENT DOCUMENTS

| | | |
|---|---|---|
| CN | 202338552 | 7/2012 |
| CN | 202851640 | 4/2013 |
| CN | 103335008 | 10/2013 |
| CN | 213419640 | 6/2021 |
| JP | 2001012431 | 1/2001 |

* cited by examiner

SCREW HAVING STACKED SCREW HEADS

FIELD OF THE INVENTION

The present disclosure relates to a screw, and particularly to a screw having stacked screw heads.

BACKGROUND OF THE INVENTION

Tamper proof screws (also called security screws or one-way screws) are designed with specific type of drives, and they are difficult or impossible to be removed or tampered by using common tools.

Generally, the tamper proof screws are applied to objects requiring anti-theft or vandal resistance protection. For example, the tamper proof screws are adopted to secure products placed outdoors in order to prevent the products from being stolen.

The security effect is achieved by specific design of the screw drives. Loosening or removing the tamper proof screws needs specific tools. Also, tightening or fastening the tamper proof screws needs the specific tools. Therefore, the inconvenience of tightening such tamper proof screws adversely affects the usage intention and popularization of the tamper proof screws especially when the user does not need to remove the screws at all. It is desired to provide a tamper proof screw which can be easily screwed in a threaded hole (tapped hole) without using a specific tool.

SUMMARY OF THE INVENTION

An aspect of the present disclosure provides a screw having stacked screw heads. The screw includes a screw shank portion wrapped with a thread and a screw head portion. The screw shank portion is adapted to be engaged in a substrate component. The screw head portion is connected to the screw shank portion and driven to bring the screw shank portion to rotate. The screw head portion includes a first screw head and a second screw head. The first screw head has a first shaped groove formed on a top plane of the first screw head and the first screw head rotates in response to an operating torque applied through the first shaped groove. The second screw head has a second shaped groove formed on a top plane of the second screw head, and a neck portion is connected to the top plane of the second screw head and a bottom plane of the first screw head. A bottom plane of the second screw head is rigidly connected to the screw shank portion. The connection between the neck portion and the first screw head or the second screw head has lower torsional endurance than each of the first screw head and the second screw head, or the neck portion has lower torsional endurance than each of the first screw head and the second screw head.

In an embodiment, at least a portion of the second shaped groove is hidden by the first screw head.

In an embodiment, the second shaped groove is exposed from the first screw head via the first shaped groove.

In an embodiment, each of the first screw head, the neck portion and the second screw head has a circular shape, and a contact area between the neck portion and the bottom plane of the first screw head is smaller than a bottom area of the first screw head.

In an embodiment, each of the first screw head, the neck portion and the second screw head has a circular shape, and a contact area between the neck portion and the top plane of the second screw head is smaller than a top area of the second screw head.

In an embodiment, the neck portion and the first screw head are made of different materials.

In an embodiment, the neck portion and the second screw head are made of different materials.

In an embodiment, the first shaped groove and the top plane of the first screw head structurally form a slot screw drive or a cross screw drive.

In an embodiment, the second shaped groove and the top plane of the second screw head structurally form a square screw drive, a hex socket screw drive, a pentalobe screw drive or a hexalobular socket screw drive.

In the screw having the stacked screw heads according to the present disclosure, the first screw head is turned to bring the screw to rotate to gradually penetrate into the threaded hole when the screw is rotatable relative to the threaded hole. The torsional endurance of the connection between the neck portion and the first screw head or the second screw head is smaller than the torsional endurance of each of the first screw head and the second screw head. When the screw is turned to a specific tightened position and will go further, the connection near the neck portion can not bear the applied torque and cracks first so that the first screw head is separated from the second screw head to expose the top plane of the second screw head and the second shaped groove. The screw drive of the first screw head corresponds to a relatively common tightening tool, and the screw drive of the second screw head corresponds to a relatively specific tightening tool. Therefore, the screw having the stacked screw heads of the present disclosure is screwed easily but unscrewed difficultly. It reduces the difficulty to tighten the tamper proof screw.

BRIEF DESCRIPTION OF THE DRAWINGS

The advantages of the present disclosure will become more readily apparent to those ordinarily skilled in the art after reviewing the following detailed description and accompanying drawings, in which.

DETAILED DESCRIPTION OF PREFERRED EMBODIMENTS

The present disclosure will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1:
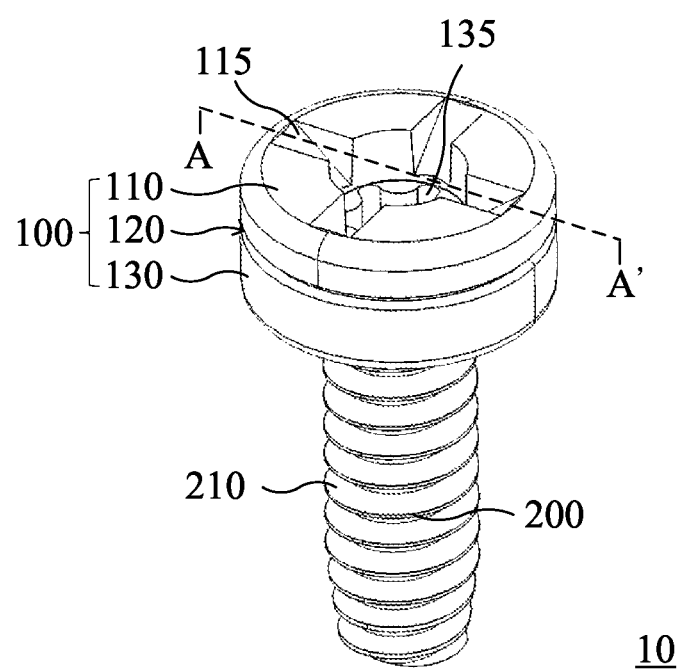
FIG. 1 is a perspective view of a screw having stacked screw heads according to an embodiment of the present disclosure.

Please refer to FIG. 1, which is a perspective view of a screw having stacked screw heads according to an embodiment of the present disclosure. In the embodiment, the screw 10, for fastening a material component to a substrate component, includes a screw head portion 100 and a screw shank portion 200 which is partially or fully threaded. The screw head portion 100 includes a first screw head 110, a neck portion 120 and a second screw head 130. The diameter of the first screw head 110 may be greater than, identical to or smaller than the diameter of the second screw head 130. The screw thread 210 wrapping around the screw shank portion 200 is configured to engage a mating thread inside a threaded hole on the substrate component (e.g. a casing of an electronic apparatus) (not shown) to which the screw 10 is to be fixed. The screw 10 rotates continuously to go deeper in the threaded hole till the screw 10 is firmly fixed to the substrate component. Because the screw shank portion 200 is rigidly connected to the screw head portion 100, the screw shank portion 200 rotates with the rotation of the screw head portion 100 due to an external torque. The threaded hole may be formed on the substrate component before the screw 10 is inserted therein, or formed as the screw 10 is driven into the substrate component.

Figure 2:
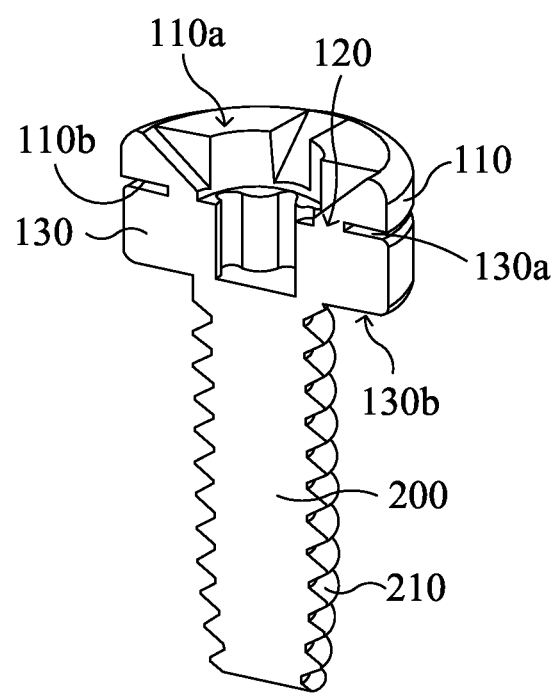
FIG. 2 is a cross-sectional view showing the screw cut along a line AA' in FIG. 1.
Figure 3:
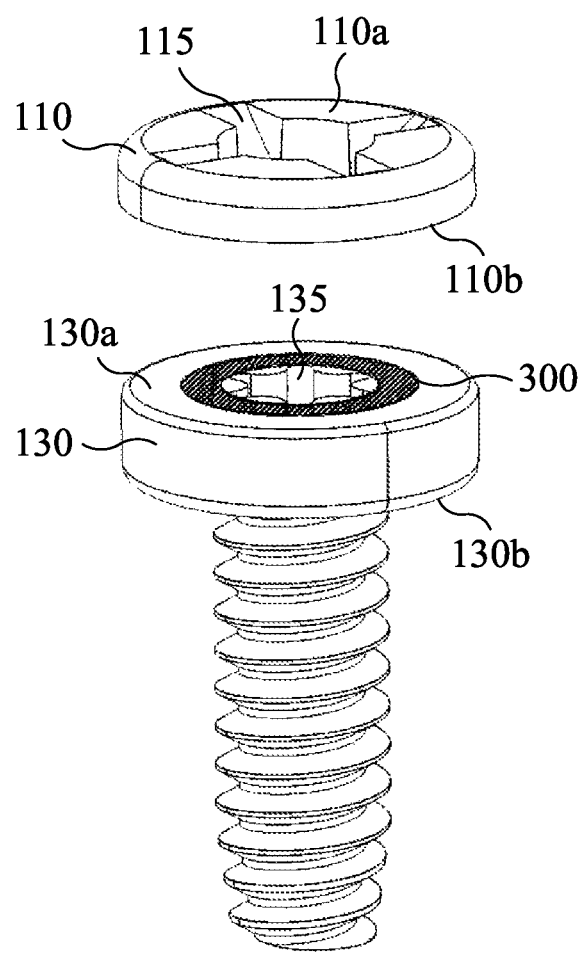
FIG. 3 is a schematic diagram showing that the first screw head is separated from the second screw head.

Please refer to both FIG. 2 and FIG. 3, wherein FIG. 2 is an axial cross-sectional view showing the screw cut along the line AA' in FIG. 1, and FIG. 3 is a schematic diagram showing that the first screw head is separated from the second screw head. A first shaped groove 115 is formed on the top plane 110a of the first screw head 110 so that a tightening tool (e.g. a mating screwdriver) can apply an operating torque to the first screw head 110 through the first shaped groove 115. The first screw head 110 is turned to drive the complete screw 10 to rotate along the same direction. A bottom plane 110b of the first screw head 110 is connected to a top plane 130a of the second screw head 130 through a neck portion 120. A bottom plane 130b of the second screw head 130 is rigidly connected to the screw shank portion 200. A second shaped groove 135 is formed on the top plane 130a of the second screw head 130 so that a tightening tool (e.g. a mating screwdriver) can apply an operating torque to the second screw head 130 through the second shaped groove 135. In various applications, when the first screw head 110 is rigidly connected to the second screw head 130 through the neck portion 120, the second shaped groove 135 may be exposed or not. In an embodiment, the second shaped groove 135 is entirely hidden by the first screw head 110 without being exposed. For example, the first shaped groove 115 does not penetrate through the bottom plane 110b so that the second shaped groove 135 can not be seen via the first shaped groove 115. In another embodiment, a portion of the second shaped groove 135 is hidden by the first screw head 110 and the other portion of the second shaped groove 135 is not covered by the first screw head 110. For example, the size of the first screw head 110 is not large enough to cover the second shaped groove 135 completely, or only a portion of the second shaped groove 135 can be seen via the first shaped grove 115 penetrating through the bottom plane 110b of the first screw head 110 because of different shapes of the grooves 115 and 135. In a further embodiment, the second shaped groove 135 is entirely exposed from the first screw head 110. For example, the first shaped groove 115 penetrating through the bottom plane 110b of the first screw head 110 does not cover any part of the second shaped groove 135.

To tighten the screw 10 in a relatively convenient manner, the first shaped groove 115 is designed to match a common tightening tool. For example, the first screw head 110 has a slot screw drive or a cross (double-slot) screw drive. Therefore, the first screw head 110 can be turned by a common hand-operated or electrical screwdriver. On the contrary, to loosen the screw 10 in a relatively difficult manner, the second shaped groove 135 is designed to match a specific tightening tool. For example, the second screw head 130 has a square (Scrulox) screw drive, a hex socket screw drive, a pentalobe screw drive or a hexalobular socket screw drive.

After the screw 10 is firmly fixed to the substrate component, the first screw head 110 is removed and the second screw head 130 is remained. Now the screw 10 using the second screw head 130 can serve as a tamper proof screw (security screw). The bottom plane 130b of the second screw head 130 presses the material component against the substrate component so as to fasten the material component and the substrate component together.

As described above, to achieve the tamper proof function, the first screw head 110 should be removed while remaining the second screw head 130 after the screw 10 is well tightened.

Figure 4:
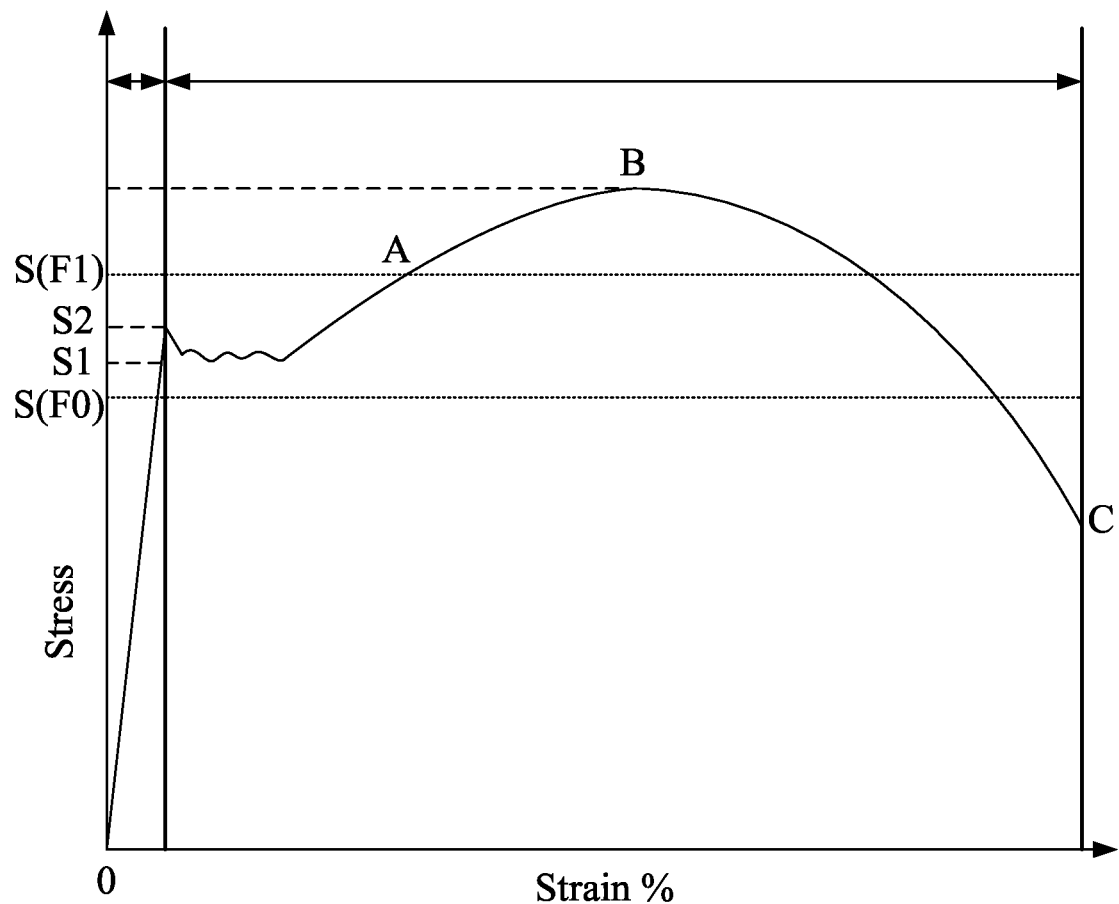
FIG. 4 is a stress-strain curve of an exemplary implementation of a screw according to an embodiment of the present disclosure.

Please refer to FIG. 4, which is a stress-strain curve of an exemplary implementation of a screw according to an embodiment of the present disclosure. In the exemplary implementation, the operating torque (torsion force) applied by the tightening tool is set to F1 and a friction torque is generated due to the friction force between the screw shank portion 200 having the thread 210 and the threaded hole (not shown) wherein the maximum static friction torque is F0. When the tightening tool starts to tighten the screw 10 in the threaded hole, the stress across the screw 10 continuously increases from zero and the screw 10 starts to rotate once the stress exceeds S(F0). During the rotation of the screw 10 in the fastening procedure, the stress in the screw 10 fluctuates up and down between S(F0) and S(F1), especially within a smaller range between S1 and S2 depending upon the fluctuating friction force in this procedure. After the second screw head 130 is in complete contact with the material component, the screw 10 is entirely fixed in the threaded hole (after Point A in FIG. 4). At this time, the operating torque F1 is not great enough to overcome the friction force between the bottom plane 130b of the second screw head 130 and the surface of the material component and the friction force between the threads of the screw shank portion 200 and the threaded hole to rotate the screw 10 further. When the screw 10 stops rotating, the operating torque applied to the screw 10 causes greater and greater stress accumulating in the screw 10. The stress reaches the maximum when cracks begin to appear in the screw 10 (Point B in FIG. 4, called tensile strength). Then, the stress due to the continuous operating torque applied to the screw 10 causes propagation of the cracks. The growth of the cracks reduces the stress on the screw till the screw 10 is broken along the cracks into two pieces (Point C in FIG. 4).

In other to break the rigid connection between the first screw head 110 and the second screw head 130 to remove the first screw head 110 and keep the second screw head 130 connected to the screw shank portion 200, the cracks are controlled to be formed between the first screw head 110 and the second screw head 130, i.e. in the neck portion 120. In an embodiment, the connection between the neck portion 120 and the first screw head 110 has lower torsional endurance than each of the first screw head 110 and the second screw head 130. Therefore, the cracks will first occur between the neck portion 120 and the first screw head 110 to break the screw 10 into two pieces near the neck portion 120. In another embodiment, the connection between the neck portion 120 and the second screw head 130 has lower torsional endurance than each of the first screw head 110 and the second screw head 130. Therefore, the cracks will first occur between the neck portion 120 and the second screw head 130 to break the screw 10 into two pieces near the neck portion 120. In a further embodiment, the neck portion 120 has lower torsional endurance than each of the first screw head 110 and the second screw head 130. Therefore, the cracks will first occur in the neck portion 120 to break the screw 10 into two pieces along the neck portion 120. The lower torsional endurance in the present disclosure means that the material or structural member has weaker yield strength or ultimate tensile strength, or a fracture or permanent deformation of the structural member occurs at lower operating torque (namely lower breaking torque).

There are several schemes for lowering the torsional endurance of the neck portion 120 or the connection between the neck portion 120 and the first screw head 110 or the second screw head 130 to make it smaller than the torsional endurance of each of the first screw head 110 and the second screw head 130. In an embodiment, the connection area between the neck portion 120 and the first screw head 110 is reduced. As shown in FIG. 1 and FIG. 2, the bottom plane 110b of the first screw head 110 is partially connected to the neck portion 120 so that the contact area between the neck portion 120 and the first screw head 110 is smaller than the area of the bottom plane 110b (bottom area) of the first screw head 110. It is known that smaller contact area bears greater shear stress. Therefore, the torsional endurance of the connection between the neck portion 120 and the first screw head 110 is lower than the torsional endurance of the first screw head 110. Similarly, the top plane 130a of the second screw head 130 is partially connected to the neck portion 120 so that the contact area between the neck portion 120 and the second screw head 130 is smaller than the area of the top plane 130a (top area) of the second screw head 130. Therefore, the torsional endurance of the connection between the neck portion 120 and the second screw head 130 is lower than the torsional endurance of the second screw head 130. In another embodiment, the material of the neck portion 120 has lower torsional endurance than the material of the first screw head 110 and/or the second screw head 130. The relative torsional endurance of the neck portion 120 to the screw heads 110 and 130 is adjusted based on the load tolerance of different materials.

In a further embodiment, the first screw head 110, the second screw head 130 and/or the neck portion 120 may have special designs to make the neck portion 120 broken when the operating torque applied through the groove 115 exceeds a torque threshold. Thus, the first screw head 110 is removed from the screw 10 and the top plane 130a of the second screw head 130 is exposed. For example, cuts or slits in a specific direction may be formed on the neck portion 120.

It is to be noted that the torsional endurance could be adjusted by any known method to meet the requirements and concepts of the present disclosure, and the application is not limited to the above embodiments.

Please refer to FIG. 3 again. After the neck portion 120 breaks and the first screw head 110 is separated from the screw 10, the second shaped groove 135 is entirely exposed and the second screw head 130 becomes the working screw head of the screw 10 while loosening the screw 10. However, there may be residual neck material remained on the contact region 300 where the neck portion 120 and the top plane 130a are previously connected. The second screw head 130 may not be driven to rotate smoothly because the residual neck material likely affects the operation regarding the second shaped groove 135. To overcome this problem, the residual neck material could be removed by any known method. In another embodiment, the positions of the contact region 300 and the region of the second shaped groove 135 do not overlap according to specific design. The second shaped groove 135 is not covered by any part of the neck portion 120. Therefore, the residual neck material will not affect the use of the second shaped groove 135.

The screw having stacked screw heads of the present disclosure could be applied to any type of screw, e.g. an ordinary screw and a self-tapping screw. Further, the generally circular shape of the first screw head 110, the neck portion 120 and the second screw head 130 shown in the diagrams are not intended to be limiting. The first screw head 110, the neck portion 120 and the second screw head 130 may take any shape that allows it to function as described in the present disclosure.

In conclusion, according to the present disclosure, the first screw head of the screw having the stacked screw heads is turned to bring the screw to rotate to gradually penetrate into the threaded hole when the screw is rotatable relative to the threaded hole. The torsional endurance of the connection between the neck portion and the first screw head or the second screw head is smaller than the torsional endurance of each of the first screw head and the second screw head. When the screw is turned to a specific tightened position and will go further, the connection near the neck portion can not bear the applied torque and cracks first so that the first screw head is separated from the second screw head to expose the second screw head. The screw drive of the first screw head corresponds to a relatively common tightening tool, and the screw drive of the second screw head corresponds to a relatively specific tightening tool. Therefore, the screw having the stacked screw heads of the present disclosure is screwed easily but unscrewed difficultly. It reduces the difficulty to tighten the improved tamper proof screw.

While the disclosure has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A screw having stacked screw heads, comprising:
    a screw shank portion wrapped with a thread and being adapted to be engaged in a substrate component;
    a screw head portion connected to the screw shank portion and driven to bring the screw shank portion to rotate, comprising:
        a first screw head having a first shaped groove formed on a top plane of the first screw head wherein the first screw head rotates in response to an operating torque applied through the first shaped groove; and
        a second screw head having a second shaped groove formed on a top plane of the second screw head wherein a neck portion is connected to the top plane of the second screw head and a bottom plane of the first screw head, and a bottom plane of the second screw head is rigidly connected to the screw shank portion, wherein a portion of the second shaped groove is hidden by the first screw head and the other portion of the second shaped groove is exposed from the first screw head via the first shaped groove,
    wherein connection between the neck portion and the first screw head or the second screw head has lower torsional endurance than each of the first screw head and the second screw head, or the neck portion has lower torsional endurance than each of the first screw head and the second screw head.

2. The screw according to claim 1, wherein each of the first screw head, the neck portion and the second screw head has a circular shape, and a contact area between the neck portion and the bottom plane of the first screw head is smaller than a bottom area of the first screw head.

3. The screw according to claim 1, wherein each of the first screw head, the neck portion and the second screw head has a circular shape, and a contact area between the neck portion and the top plane of the second screw head is smaller than a top area of the second screw head.

4. The screw according to claim 1, wherein the neck portion and the first screw head are made of different materials.

5. The screw according to claim 1, wherein the neck portion and the second screw head are made of different materials.

6. The screw according to claim 1, wherein the first shaped groove and the top plane of the first screw head structurally form a slot screw drive or a cross screw drive.

7. The screw according to claim 1, wherein the second shaped groove and the top plane of the second screw head structurally form a square screw drive, a hex socket screw drive, a pentalobe screw drive or a hexalobular socket screw drive.

* * * * *